UNITED STATES PATENT OFFICE.

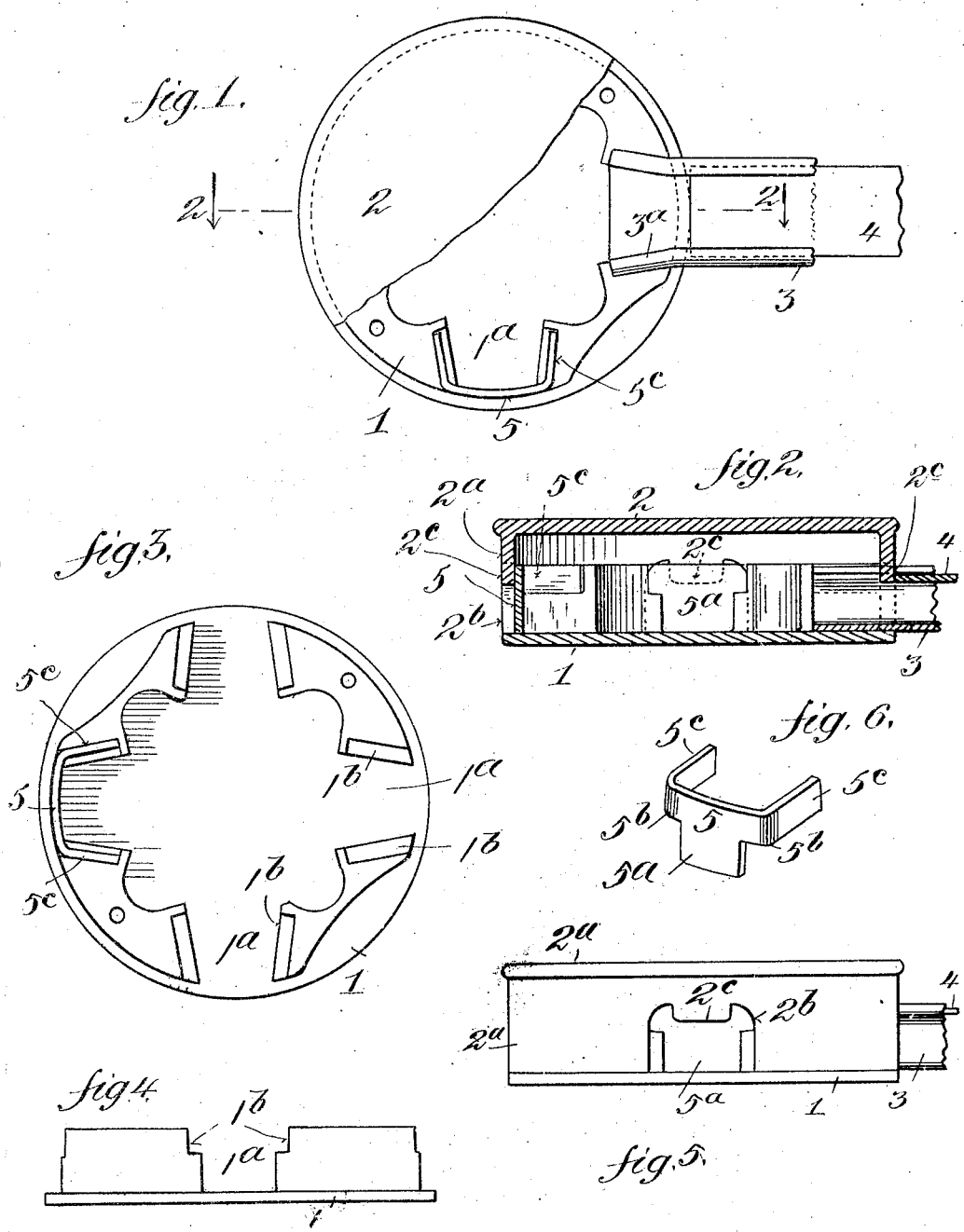
G. A. LUTZ.
OUTLET OR JUNCTION BOX.
APPLICATION FILED DEC. 17, 1910.
1,099,987.  Patented June 16, 1914.

GEORGE A. LUTZ, OF PLAINFIELD, NEW JERSEY.

OUTLET OR JUNCTION BOX.

1,099,987. Specification of Letters Patent. Patented June 16, 1914.

Application filed December 17, 1910. Serial No. 597,766.

*To all whom it may concern:*

Be it known, that I, GEORGE A. LUTZ, a citizen of the United States, and resident of Plainfield, in the county of Union and State of New Jersey, have invented certain new and useful Improvements in Outlet or Junction Boxes, of which the following is a specification.

The object of my invention is to provide improved means for closing the openings or outlets in outlet or junction boxes, and to permit the ready removal of the closures for connection of the outlets with conduits.

I have illustrated my improvements in connection with the class of outlet or junction box set forth in Letters Patent No. 929,097, granted July 27, 1909 to George A. Lutz and C. C. Sibley.

In carrying out my present invention I provide closures for the outlets having arms projecting into socket members at the outlets, whereby said closures are retained in place and can be readily removed when conduits are to be applied to the outlets, the cover for the box being detachably retained thereon.

My invention further comprises novel details of improvement that will be more fully hereinafter set forth and then pointed out in the claims.

Reference is to be had to the accompanying drawings forming part hereof, wherein—

Figure 1 is a plan view, partly broken, of an outlet box embodying my invention; Fig. 2 is a section on the line 2, 2, in Fig. 1; Fig. 3 is a plan view of the box, the cover being removed, illustrating one of the closures in place; Fig. 4 is an edge view of the box, the cover being removed; Fig. 5 is an edge view of Fig. 1, showing the cover in position, and Fig. 6 is a detail of the closure.

Similar numerals of reference indicate corresponding parts in the several views.

The box 1, which may be of any suitable construction, I have illustrated substantially in the form shown in Letters Patent No. 929,097, aforesaid, and provided with outlets $1^a$ shown in the form of socket members projecting inwardly from the wall of the box and having open tops that are closed by cover 2. The side walls of the outlets or socket members $1^a$ are shown provided with offset channeled or grooved portions $1^b$ adapted to receive the flared end portions $3^a$ of conduits 3. Said conduits are shown in wellknown channel form having removable covers 4, the ends of the conduits being adapted to fit within the socket members. The closures 5 for the outlets, which may be made of stamped metal, have the front wall portion $5^a$ fitted between the walls of the outlets below the channeled or grooved portions $1^b$, and side extensions $5^b$ adapted to extend in line with the grooves $1^b$, to close the ends of the outlets, the closures 5 also having projecting arms $5^c$ fitting in the grooves $1^b$. Where the grooves $1^b$ are flared or converging the arms $5^c$ are correspondingly shaped, whereby the closures 5 are kept from outward sliding movement, and may be inserted and removed at the upper open portions of the outlets $1^a$ by sliding the parts $5^a$ and $5^c$ edgewise. The cover 2 is shown provided with a flange $2^a$ depending around the box and provided with openings $2^b$ alined with the outlets $1^a$. The flange $2^a$ of the cover is shown provided with lugs $2^c$ that project in front of closures 5 and in line with the covers 4 of the conduits to limit the inward movement of the covers with respect to the box.

With a box equipped with my improvements when it is desired to connect one or more conduits with the outlets $1^a$ the cover is removed, the desired closure 5 is taken out and the conduit connected with the outlet $1^a$ in wellknown manner, as in Fig. 1, the cover being then replaced, its opening $2^b$ receiving the conduit, the lug $2^c$ then being in line with cover 4. Where a conduit is not connected with an outlet $1^a$ the closure 5 fills the space and protects the interior of the box.

It will be understood that as the closures 5 are made separate from the box and applied thereto there are no breakable "knockouts" as customarily used in outlet boxes, and furthermore that where a conduit is disconnected from the box the corresponding outlet may be readily closed by the insertion of a closure 5 to protect such outlet.

Having now described my invention what I claim is:—

1. An outlet or junction box having an outlet provided with recesses in its side walls extending inwardly from the periphery of the box, and a closure for the outlet provided with spaced projecting portions fitted in said recesses.

2. An outlet or junction box provided with an outlet having converging side walls provided with recesses and a closure for the outlet having arms fitted in said recesses.

3. An outlet or junction box having an outlet, a closure removably fitted to the walls of the outlet, and a cover for the box having a flange depending around and inclosing the walls of the box and provided with an opening alined with said outlet and closure.

4. An outlet or junction box having an outlet, a closure removably fitted to the walls of the outlet, and a cover for the box having a flange depending around and inclosing the walls of the box and provided with an opening alined with said outlet and closure, said cover being provided with a depending lug alined with the outlet.

Signed at New York city, in the county of New York and State of New York, this 14th day of December, A. D. 1910.

GEORGE A. LUTZ.

Witnesses:
MAX M. KOTZEN,
MARIE F. WAINRIGHT.